(12) United States Patent
Trita

(10) Patent No.: US 10,838,146 B2
(45) Date of Patent: Nov. 17, 2020

(54) SINGLE MODE WAVEGUIDE WITH AN ADIABATIC BEND

(71) Applicant: ROCKLEY PHOTONICS LIMITED, London (GB)

(72) Inventor: Andrea Trita, Pasadena, CA (US)

(73) Assignee: Rockley Photonics Limited, London (GB)

( * ) Notice: Subject to any disclaimer, the term of this patent is extended or adjusted under 35 U.S.C. 154(b) by 0 days.

(21) Appl. No.: 15/489,669

(22) Filed: Apr. 17, 2017

(65) Prior Publication Data

US 2017/0351025 A1  Dec. 7, 2017

Related U.S. Application Data

(60) Provisional application No. 62/345,671, filed on Jun. 3, 2016.

(51) Int. Cl.
*G02B 6/12* (2006.01)
*G02B 6/125* (2006.01)
(Continued)

(52) U.S. Cl.
CPC .......... *G02B 6/12011* (2013.01); *G02B 6/125* (2013.01); *G02B 6/12009* (2013.01);
(Continued)

(58) Field of Classification Search
CPC ............ G02B 6/12011; G02B 6/12014; G02B 6/12016; G02B 6/1228; G02B 6/125; G02B 6/29352; G02B 2006/12097
See application file for complete search history.

(56) References Cited

U.S. PATENT DOCUMENTS

| 4,786,131 A | 11/1988 | Mahapatra et al. |
| 5,212,758 A * | 5/1993 | Adar .................. G02B 6/12011 385/129 |

(Continued)

FOREIGN PATENT DOCUMENTS

| CN | 104781708 A | 7/2015 |
| EP | 0 645 649 A2 | 3/1995 |

(Continued)

OTHER PUBLICATIONS

Bogaerts, Wim & Selvaraja, Shankar Kumar. (2011). Compact Single-Mode Silicon Hybrid Rib/Strip Waveguide With Adiabatic Bends. Photonics Journal, IEEE. 3. 422-432.*

(Continued)

*Primary Examiner* — Peter Radkowski
(74) *Attorney, Agent, or Firm* — Lewis Roca Rothgerber Christie LLP

(57) ABSTRACT

A single mode waveguide with a straight portion and a curved portion, the curved portion having the shape of an adiabatic bend. The single mode waveguide has a curved portion that is shaped according to an adiabatic bend, with a curvature that varies continuously, and that vanishes at a point at which the curved portion is contiguous with a straight portion of the waveguide. The absence of curvature discontinuities avoids the coupling, within the waveguide, of optical power from a fundamental mode into a higher order mode and the curvature of the curved portion results in attenuation of optical power, in higher order modes, that may be coupled into the waveguide at either end.

14 Claims, 8 Drawing Sheets

(51) Int. Cl.
G02B 6/28 (2006.01)
G02B 6/122 (2006.01)
G02B 6/293 (2006.01)

(52) U.S. Cl.
CPC ..... *G02B 6/12014* (2013.01); *G02B 6/12016* (2013.01); *G02B 6/1228* (2013.01); *G02B 6/2813* (2013.01); *G02B 6/29352* (2013.01); *G02B 2006/12097* (2013.01)

(56) References Cited

U.S. PATENT DOCUMENTS

| | | | |
|---|---|---|---|
| 5,838,844 A * | 11/1998 | Van Dam | G02B 6/12011 385/14 |
| 6,212,323 B1 * | 4/2001 | Harpin | G02B 6/12011 385/129 |
| 6,516,120 B2 | 2/2003 | Roberts et al. | |
| 8,045,834 B2 * | 10/2011 | Painter | B82Y 20/00 385/129 |
| 8,094,987 B2 * | 1/2012 | Martin Armani | B82Y 20/00 385/129 |
| 8,620,120 B2 * | 12/2013 | Baets | G01D 5/268 385/14 |
| 9,075,251 B2 * | 7/2015 | Dwivedi | G02B 6/1225 |
| 9,606,293 B2 * | 3/2017 | Ma | G02B 6/2766 |
| 9,690,045 B2 * | 6/2017 | Goodwill | G02B 6/126 |
| 9,696,478 B2 * | 7/2017 | Bogaerts | G02B 6/0013 |
| 9,778,417 B2 * | 10/2017 | Cherchi | G02B 6/262 |
| 2009/0285542 A1 * | 11/2009 | Martin Armani | B82Y 20/00 385/146 |
| 2011/0116735 A1 * | 5/2011 | Baets | G01D 5/268 385/12 |
| 2011/0138860 A1 * | 6/2011 | Martin Armani | B82Y 20/00 65/386 |
| 2014/0161384 A1 * | 6/2014 | Dwivedi | G02B 6/1225 385/1 |
| 2015/0260916 A1 * | 9/2015 | Cherchi | G02B 6/125 385/32 |
| 2015/0277042 A1 * | 10/2015 | Goodwill | G02B 6/126 385/11 |
| 2016/0025931 A1 * | 1/2016 | Bogaerts | G02B 6/0016 385/14 |
| 2017/0071510 A1 * | 3/2017 | Delbeke | A61B 5/0031 |
| 2017/0205578 A1 * | 7/2017 | Van Thourhout | G02B 6/126 |
| 2017/0299902 A1 * | 10/2017 | Yu | G02F 1/025 |

FOREIGN PATENT DOCUMENTS

| | | |
|---|---|---|
| EP | 1 464 997 A1 | 10/2004 |
| GB | 2 378 260 A | 2/2003 |
| JP | 11-64654 A | 3/1999 |
| JP | 2006-78570 A | 3/2006 |
| JP | 2006-091679 A | 4/2006 |
| WO | WO 02/14915 A2 | 2/2002 |
| WO | WO 02/14918 A1 | 2/2002 |
| WO | WO 0214915 A2 * | 2/2002 ..... G02B 6/122 |
| WO | WO 03/048826 A2 | 6/2003 |
| WO | WO 03048826 A2 * | 6/2003 ..... G02B 6/29301 |
| WO | WO 2014/060648 A1 | 4/2014 |
| WO | WO 2018/146221 A1 | 8/2018 |

OTHER PUBLICATIONS

A. Trita, E. Voet, J. Vermeiren, D. Delbeke, P. Dumon, S. Pathak, and D. Van Thourhout, "Miniaturized Fiber Bragg Grating Interrogator based on an Arrayed Waveguide Grating in SOI platform," in Frontiers in Optics 2015, OSA Technical Digest (online) (Optical Society of America, 2015), paper FTh3E.6.*
Bogaerts, Wim & Selvaraja, Shankar Kumar. (2011). Compact Single-Mode Silicon Hybrid Rib/Strip Waveguide With Adiabatic Bends. Photonics Journal, IEEE. 3. 422-432. 10.1109/JPHOT.2011.2142931.*
Pathak, Shibnath, Silicon nano-Photonics based Arrayed Waveguide Gratings, IMEC, Mar. 2014.*
Watts, Michael;, Adiabatic miocronring resonators, Optics Letters, V. 35, N. 19, 2010, p. 3231.*
X. Zhou and G. W. Pan, "Application of Physical Spline Finite Element Method (PSFEM) to Fullwave Analysis of Waveguides," Progress in Electromagnetics Research, vol. 60, 19-41, 2006. doi:10.2528/PIER05081102 http://www.jpier.org/PIER/pier.php?paper=0508112.*
University of California, Natural Splines, CS 294-13, Advanced Computer Graphics, Subdivision Basics, available at https://inst.eecs.berkeley.edu/~cs294-13/fa09/lectures/294-lecture17.pdf.*
Charles et al., Techniques for Designing Physically Path-Length Matched Optical Circuitry, IQEC/CLEO Pacific Rim 2011, pp. 73-75.*
Charles et al., Design of optically path-length-matched, three-dimensional photonic circuits comprising uniquely routed waveguides, Appl. Opt. 51,6489-6497 (2012).*
Jared F. Bauters, Martijn J. R. Heck, Dennis John, Daoxin Dai, Ming-Chun Tien, Jonathon S. Barton, Arne Leinse, René G. Heideman, Daniel J. Blumenthal, and John E. Bowers, "Ultra-low-loss high-aspect-ratio Si3N4 waveguides," Opt. Express 19, 3163-3174 (2011) (Year: 2011).*
Berlatzky et al., Controlling Coupling of Guided to Radiating Modes Using Adiabatic Transitions Between Waveguides of Different Curvature, Journal of Lightwave Technology, vol. 23, No. 3, Mar. 2005 (Year: 2005).*
C. Koos, C. G. Poulton, L. Zimmermann, L. Jacome, J. Leuthold and W. Freude, "Ideal Bend Contour Trajectories for Single-Mode Operation of Low-Loss Overmoded Waveguides," in IEEE Photonics Technology Letters, vol. 19, No. 11, pp. 819-821, Jun. 1, 2007. (Year: 2007).*
X. Tu et al., "Compact low-loss adiabatic bends in silicon shallow-etched waveguides," 2016 IEEE 13th International Conference on Group IV Photonics (GFP), Shanghai, 2016, pp. 48-49. doi: 10.1109/Group4.2016.7739046 (Year: 2016).*
Ismail et al., Improved arrayed-waveguide-grating layout avoiding systematic phase errors, Optics Express, V. 19, N. 9, p. 8781, 2011 (Year: 2011).*
Kim et al., Investigation of 18-channel CWDM arrayed waveguide grating with silica-based waveguide, Opt. Eng. 55(8), 087110 (2016), doi: 10.1117/1.OE.55.8.087110 (Year: 2016).*
Takahashi et al., Wavelength multiplexer based on SiO/sub 2/-Ta/sub 2/O/sub 5/ arrayed-waveguide grating, Lightwave Technology Journal of, vol. 12, No. 6, pp. 989-995, 1994. (Year: 1994).*
International Search Report and Written Opinion of the International Searching Authority, dated Oct. 16, 2017, Corresponding to PCT/GB2017/051470, 25 pages.
Invitation to Pay Additional Fees and Partial Search Report dated Aug. 21, 2017 in related International Application No. PCT/GB2017/051470; 17 pages.
Baets, R. et al., "Loss calculation and design of arbitrarily curved integrated-optic waveguides", Optical Society of America, Feb. 1983, pp. 177-182, vol. 73, No. 2.
Cherchi, Matted et al., "Dramatic size reduction of waveguide bends on a micron-scale silicon photonic platform", Optics Express, Jul. 29, 2013, pp. 17814-17823, vol. 21, No. 15.
Feng, Dazeng et al., "Compact single-chip VMUX/DEMUX on the silicon-on-insulator platform", Optics Express, Mar. 28, 2011, pp. 6125-6130, vol. 19, No. 7.
Mustieles, F. J. et al., "Theoretical S-Bend Profile for Optimization of Optical Waveguide Radiation Losses", IEEE Photonics Technology Letters, May 1993, pp. 551-553, vol. 5, No. 5.
Okamoto, Katsunari, "Wavelength-Division-Multiplexing Devices in Thin SOI: Advances and Prospects", IEEE Journal of Selected Topics in Quantum Electronics, Jan. 10, 2014, 10 pages, vol. 20, No. 4.
Pathak, S. et al., Comparison of AWGs and Echelle Gratings for Wavelength Division Multiplexing on Silicon-on-Insulator, IEEE Photonics Journal, Oct. 15, 2014, 10 pages, vol. 6, No. 5.
Rickman, Andrew, "The commercialization of silicon photonics", Nature Photonics, Aug. 2014, pp. 579-582, vol. 8.

(56) References Cited

OTHER PUBLICATIONS

Soref, Richard A. et al., "Large Single-Mode Rib Waveguides in GeSi—Si and Si-on-SiO$_2$", IEEE Journal of Quantum Electronics, Aug. 1991, pp. 1971-1974, vol. 27, No. 8.

U.K. Intellectual Property Office Examination Report, dated Aug. 30, 2018, for Patent Application No. GB1812302.6, 2 pages.

Pathak, Shibnath, "Silicon Nano-Photonics Based Arrayed Waveguide Gratings", University of Gwent, Jan. 2014, 234 pages.

Sheehan, Robert N. et al., "The design of low-loss curved waveguides", Optical and Quantum Electronics, Aug. 21, 2009, pp. 1211-1218, vol. 40, Springer Science+Business Media, LLC.

U.K. Intellectual Property Office Examination Report, dated Feb. 15, 2019, for Patent Application No. GB1812302.6, 7 pages.

Ismail, Nur et al., "Improved arrayed-waveguide-grating layout avoiding systematic phase errors" Optics Express, Apr. 25, 2011, pp. 8781-8794, vol. 19, No. 9, OSA.

Kim, Wan-Chun et al., "Investigation of 18-channel CWDM arrayed waveguide grating with silica-based waveguide", Optical Engineering, Aug. 24, 2016, pp. 087110-1 through 087110-6, vol. 55, No. 8.

Sheng, Kee Jack, "Design, Fabrication and Experimental Characterization of a PDMS-Based AWG Spectrometer", Thesis submitted to the Nanyang Technological University in fulfillment of the requirement for the degree of Doctor of Philosophy, 2011, 183 pages.

Takahashi, Hiroshi et al., "Wavelength Multiplexer Based on SiO$_2$—Ta$_2$O$_5$ Arrayed-Waveguide Grating", Journal of Lightwave Technology, pp. 989-995, Jun. 1994, vol. 12, No. 6, IEEE.

Chinese Notification of the First Office Action, for Patent Application No. CN201780034439.8, dated Apr. 26, 2020, 10 pages.

Muneeb, M. et al., "Silicon-on-insulator shortwave infrared wavelength meter with integrated photodiodes for on-chip laser monitoring", Optics Express, Nov. 3, 2014, pp. 27300-27308, vol. 22, No. 22, Optical Society of America.

Partial English translation of Chinese Notification of the First Office Action, for Patent Application No. CN201780034439.8, dated Apr. 26, 2020, 8 pages.

U.K. Intellectual Property Office Examination Report, dated Feb. 12, 2020, for Patent Application No. GB1812302.6, 4 pages.

* cited by examiner

SINGLE MODE WAVEGUIDE WITH AN ADIABATIC BEND

CROSS-REFERENCE TO RELATED APPLICATION(S)

The present application claims priority to and the benefit of U.S. Provisional Application No. 62/345,671 filed Jun. 3, 2016, entitled "Efficient High Order Modes (HOMs) Control in Arrayed Waveguide Gratings (AWGs) Using Adiabatic Bends", the entire content of which is incorporated herein by reference.

FIELD

One or more aspects of embodiments according to the present invention relate to large optical rib waveguides, and more particularly to a single mode waveguide having an adiabatic bend.

BACKGROUND

Large single mode rib waveguides have been proposed to guide light along various paths of an integrated circuit as they allow relaxed fabrication tolerances and easier coupling to an external optical fiber. Due to the large cross section, transient propagation of leaky high order modes is possible in large single mode rib waveguides, which may have effects tending to degrade the performance of a photonic integrated circuit. Thus, there is a need for an improved system and method for minimizing transient propagation of leaky high order modes in large optical rib waveguides.

SUMMARY

Aspects of embodiments of the present disclosure are directed toward a large single mode rib waveguide with a straight portion and a curved portion, the curved portion having the shape of an adiabatic bend. The large single mode rib waveguide has a curved portion that is shaped according to an adiabatic bend, with a curvature that varies continuously, and that vanishes at a point at which the curved portion is contiguous with a straight portion of the waveguide. The absence of curvature discontinuities avoids the coupling, within the waveguide, of optical power from a fundamental mode into a leaky higher order mode and the curvature of the curved portion results in attenuation of optical power, in leaky higher order modes, that may be coupled into the waveguide at either end.

According to an embodiment of the present invention there is provided an arrayed waveguide grating having an input waveguide and an output waveguide, the arrayed waveguide grating including: a first input star coupler aperture connected to the input waveguide; a first free-propagation region; a first output star coupler aperture; a second input star coupler aperture; an array of waveguides, extending into the first output star coupler aperture and into the second input star coupler aperture and connecting the first output star coupler aperture to the second input star coupler aperture; a second free-propagation region; and a second output star coupler aperture connected to the output waveguide, the first input star coupler aperture being coupled to the first output star coupler aperture through the first free-propagation region, the second input star coupler aperture being coupled to the second output star coupler aperture through the second free-propagation region, a first waveguide of the array of waveguides having: a first portion, and a second portion having a first end and a second end, the first portion being within the first output star coupler aperture and having a maximum curvature less than 0.01/mm, the second portion being outside the first output star coupler aperture, the second portion being contiguous, at the first end of the second portion, with the first portion, the second portion having: at the first end of the second portion, a curvature less than 0.01/mm, at the second end of the second portion, a curvature less than 0.01/mm, and at a point between the first end of the second portion and the second end of the second portion, a curvature greater than 0.3/mm, and the magnitude of the rate of change of curvature of the first waveguide being, everywhere on a segment of the first waveguide including the first portion and the second portion, less than 15/mm$^2$.

In one embodiment, the first waveguide of the array of waveguides further has: a third portion, and a fourth portion having a first end and a second end, the third portion being within the second input star coupler aperture and having a maximum curvature less than 0.01/mm, the fourth portion being outside the second input star coupler aperture, the fourth portion being contiguous, at the first end of the fourth portion, with the third portion, the fourth portion having: at the first end of the fourth portion, a curvature less than 0.01/mm, and at the second end of the fourth portion, a curvature greater than 0.3/mm, and the magnitude of the rate of change of curvature of the first waveguide being, everywhere on a segment of the first waveguide including the third portion and the fourth portion, less than 15/mm$^2$.

In one embodiment, the first output star coupler aperture includes a plurality of tapered rib waveguides.

In one embodiment, each of the tapered rib waveguides has a rib having: a first width at a first end of the first input star coupler aperture adjacent the first free-propagation region, and a second width at a second end of the first input star coupler aperture, the second end being opposite the first end of the first input star coupler aperture, the first width being at least 30% greater than the second width.

In one embodiment, the first output star coupler aperture has a length and includes: a first dummy waveguide on a first side of the array of waveguides, the first dummy waveguide extending only along the length of the first output star coupler aperture; and a second dummy waveguide on a second side of the array of waveguides, opposite the first side, the second dummy waveguide extending only along the length of the first output star coupler aperture.

In one embodiment, within the first L bend portion, each waveguide of the array of waveguides has a bend, resulting in a change of direction of more than 60 degrees and less than 120 degrees, and within the second L bend portion, each waveguide of the array of waveguides has a bend, resulting in a change of direction of more than 60 degrees and less than 120 degrees.

In one embodiment, within the first L bend portion, each waveguide of the array of waveguides is a strip waveguide, and within the second L bend portion, each waveguide of the array of waveguides is a strip waveguide.

In one embodiment, each waveguide of the array of waveguides has a straight portion between the first L bend portion and the second L bend portion.

In one embodiment, the array of waveguides has a rib to strip converter portion between the first output star coupler aperture and the first L bend portion, the rib to strip converter having a rib end and a strip end, each waveguide of the array of waveguides being a rib waveguide at the rib end of the rib to strip converter, and a strip waveguide at the strip end of the rib to strip converter, and having, within the rib to strip converter, a cross section varying continuously from a cross section of a rib waveguide to a cross section of a strip waveguide.

In one embodiment, each waveguide of the array of waveguides has a curvature of less than 0.01/mm within the rib to strip converter.

In one embodiment, each waveguide of the array of waveguides has, along its length, a rate of change of curvature with a magnitude of less than 15/mm$^2$.

In one embodiment, the second portion is configured to transmit, from the first end of the second portion, to the second end of the second portion: with an attenuation of less than 1 dB: a fundamental transverse electric mode, and a fundamental transverse magnetic mode, and with an attenuation of more than 10 dB: a first-order transverse electric mode, and a first-order transverse magnetic mode.

According to an embodiment of the present invention there is provided an optical structure, including: a section of waveguide having a maximum curvature of at least 0.3/mm; and an interference region, directly connected to one end of the section of waveguide, the magnitude of the rate of change of curvature being less, everywhere on the section of waveguide, than 15/mm$^2$.

In one embodiment, the section of waveguide has a length of at least 0.5 mm.

In one embodiment, the interference region is a multimode interference coupler.

In one embodiment, the optical structure includes a Mach-Zehnder interferometer having two arms, the multimode interference coupler being an optical power splitter or an optical power combiner, and the section of waveguide being a portion of one of the two arms.

In one embodiment, the interference region is a free-propagation region of a star coupler.

According to an embodiment of the present invention there is provided a optical waveguide, including: a section of waveguide consisting of: a first portion of waveguide; and a second portion of waveguide, the optical waveguide being a single mode optical waveguide, the second portion of waveguide being contiguous with the first portion of waveguide, the first portion of waveguide having a length of at least 0.2 mm and a maximum curvature of at most 0.01/mm, the second portion of waveguide having a length of at least 0.5 mm, and a maximum curvature of at least 0.3/mm, and the magnitude of the rate of change of curvature being less, everywhere on the section of waveguide, than 15/mm$^2$.

In one embodiment, the optical includes a tapered rib, a width of the tapered rib at a first end of the first portion being at least 30% greater than a width of the tapered rib at a second end of the first portion, opposite the first end of the first portion, the first portion having a length of at least 0.2 mm and a maximum curvature of at most 0.01/mm.

In one embodiment, the rate of change of curvature along a second portion of the section of waveguide is constant to within 20%, the second portion having a length of at least 0.5 mm, and a maximum curvature of at least 0.3/mm.

In one embodiment, the optical includes the optical waveguide of claim 18, wherein: the second portion of waveguide has a first end contiguous with the first portion of waveguide, and a second end, the second end being configured to receive light transmitted from an end, adjacent the second end, of an optical fiber.

In one embodiment, the second portion of waveguide has the shape of an S.

BRIEF DESCRIPTION OF THE DRAWINGS

These and other features and advantages of the present invention will be appreciated and understood with reference to the specification, claims, and appended drawings, wherein:

DETAILED DESCRIPTION

The detailed description set forth below in connection with the appended drawings is intended as a description of exemplary embodiments of a large single mode rib waveguide with an adiabatic bend provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
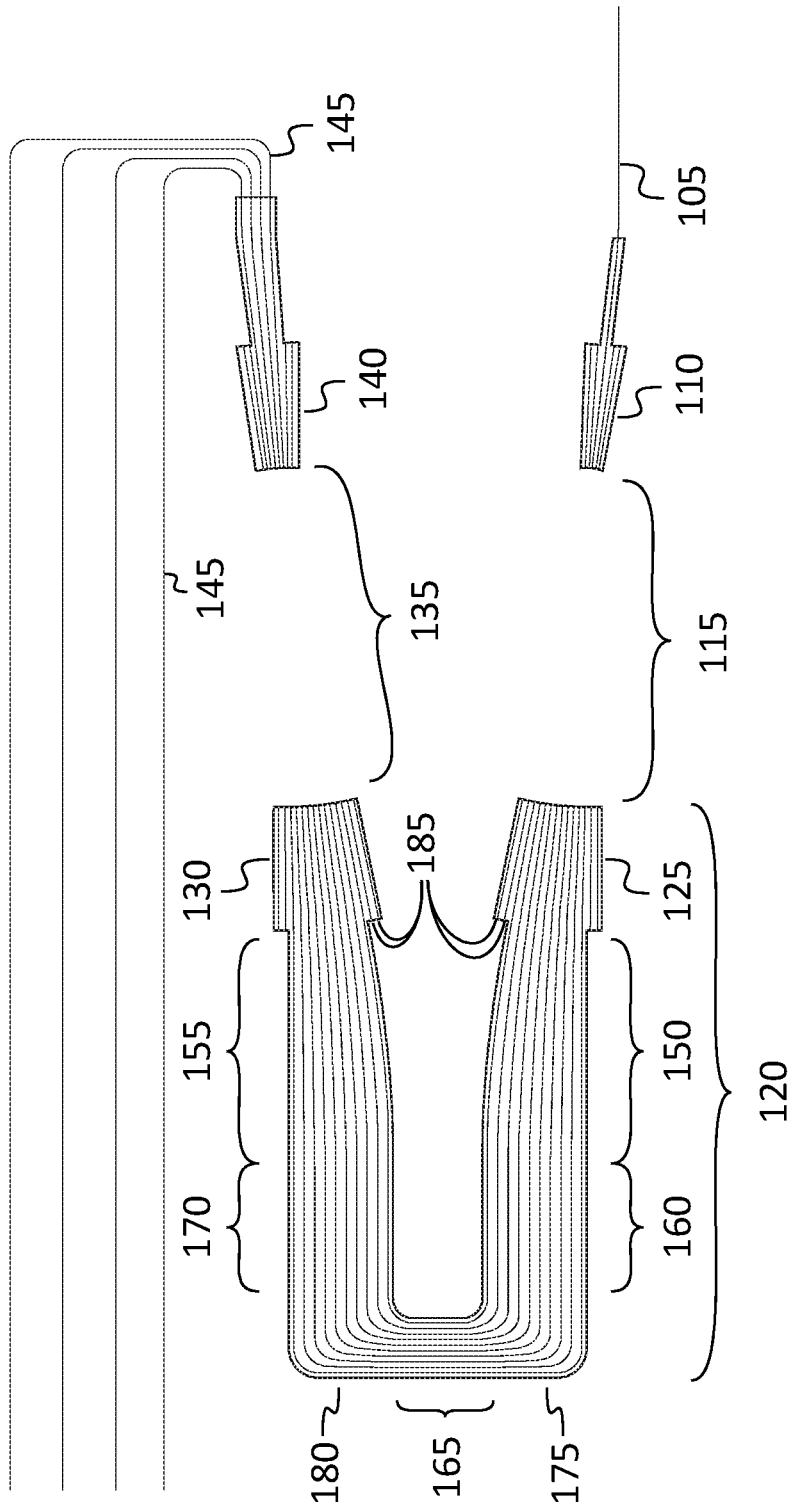
FIG. 1 is a plan view of an arrayed waveguide grating, according to an embodiment of the present invention.

Referring to FIG. 1, in one embodiment an arrayed waveguide grating includes a first optical waveguide (or simply "waveguide") 105 connected to a first input star coupler aperture 110, a first free-propagation-region 115, a waveguide array 120 including a first output star coupler aperture 125 and a second input star coupler aperture 130, a second free-propagation region 135, and a second output star coupler aperture 140 connected to a plurality of second waveguides 145. The first input star coupler aperture 110, the first free-propagation-region 115, and the first output star coupler aperture 125 together form a first star coupler, and the second input star coupler aperture 130, the second free-propagation region 135, and the second output star coupler aperture 140 together form a second star coupler. Although some of the terminology herein is chosen to correspond to light propagating into the first waveguide 105, through the arrayed waveguide grating, and out of one or more of the second waveguides 145, the arrayed waveguide grating may operate in either direction, with, e.g., the first waveguide being the input or the output. Accordingly, although a waveguide (e.g., the first waveguide 105 may be referred to herein as the "input" waveguide, this terminology is intended only to distinguish it from one or more other waveguides, e.g., one of the second waveguides 145, each of which may be referred to as an "output" waveguide, without this disclosure or the claims being limited to a particular direction of propagation of the light. When employed in one direction, the first waveguide 105 may be the input, and light may be guided by the first waveguide 105 to the first input star coupler aperture 110, where it may be launched into, and propagate across, the first free-propagation region 115. The light may then be coupled from the first free-propagation region 115 into all of the waveguides of the waveguide array 120 by the first output star coupler aperture 125, be guided to the second input star coupler aperture 130 by the waveguides of the waveguide array 120, and launched into the second free-propagation region 135 by the second input star coupler aperture 130. At the other end of the second free-propagation region 135, wavelength-dependent interference may cause light of different wavelengths to form peaks at the locations of different waveguides of the plurality of second waveguides 145 extending into the second output star coupler aperture 140. Light at these different wavelengths may accordingly be coupled, by the second output star coupler aperture 140, into different respective waveguides of the plurality of second waveguides 145. In some embodiments light may propagate through the arrayed waveguide grating in the opposite direction, with one or more of the plurality of second waveguides 145 being the input or inputs, and the first waveguide 105 being the output.

Although a 1×N arrayed waveguide grating is illustrated in FIG. 1, having one first waveguide 105 and a plurality of second waveguides (e.g., N second waveguides), other embodiments may be fabricated in an analogous manner to be M×N arrayed waveguide gratings, having M first waveguides and N second waveguides. Similarly, further embodiments may be fabricated to be cyclic N×N arrayed waveguide gratings or non-cyclic N×N arrayed waveguide gratings. Embodiments of the invention may be fabricated in any high index contrast system suitable for forming tight 90 degree bends, e.g., silicon on insulator (SOI), indium phosphide (InP), or silicon nitride/silicon dioxide (SiN/SiO$_2$).

To the extent that leaky higher order modes (which may be referred to, for brevity, as "higher order modes") are present in the light propagating in the waveguide array 120, they may result in a degradation in performance. For example, if a leaky higher order mode is excited in the waveguides of the waveguide array 120 beyond the fundamental mode, having a different propagation velocity with respect to the fundamental mode, it will result in an interference pattern at the second output star coupler aperture 140 different from the interference pattern caused by the fundamental mode propagating in the waveguide array 120, and this may result, for example, in ghost peaks in the spectral response that would otherwise be absent. For example, if the arrayed waveguide grating is configured so that the first waveguide 105 is the input, a ghost peak at the output of the second free-propagation region 135 may result in light coupling into an output waveguide for which it is not intended, producing crosstalk.

The waveguides of the arrayed waveguide grating are single mode e.g., they may guide two fundamental modes (e.g., a "TE0" transverse electric fundamental mode or a "TM0" transverse magnetic fundamental mode; these modes may theoretically propagate with no loss in the ideal case of a straight waveguide with smooth walls, composed of lossless dielectric materials) and they may support leaky higher order modes which are inherently lossy, exhibiting loss in the order of a few dB/cm, which can propagate for long distances inside the device before undergoing significant attenuation and which may thus pose a threat to proper operation of the device.

Figure 2B:
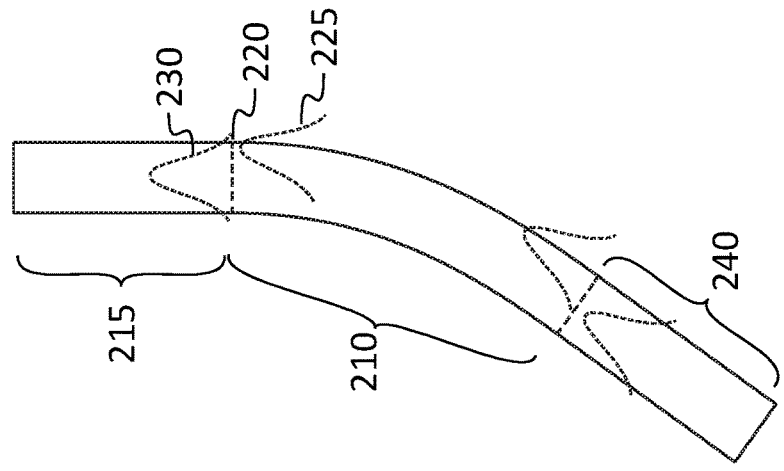
FIG. 2B is an enlarged view of a portion of FIG. 2A, according to an embodiment of the present invention.
Figure 2A:
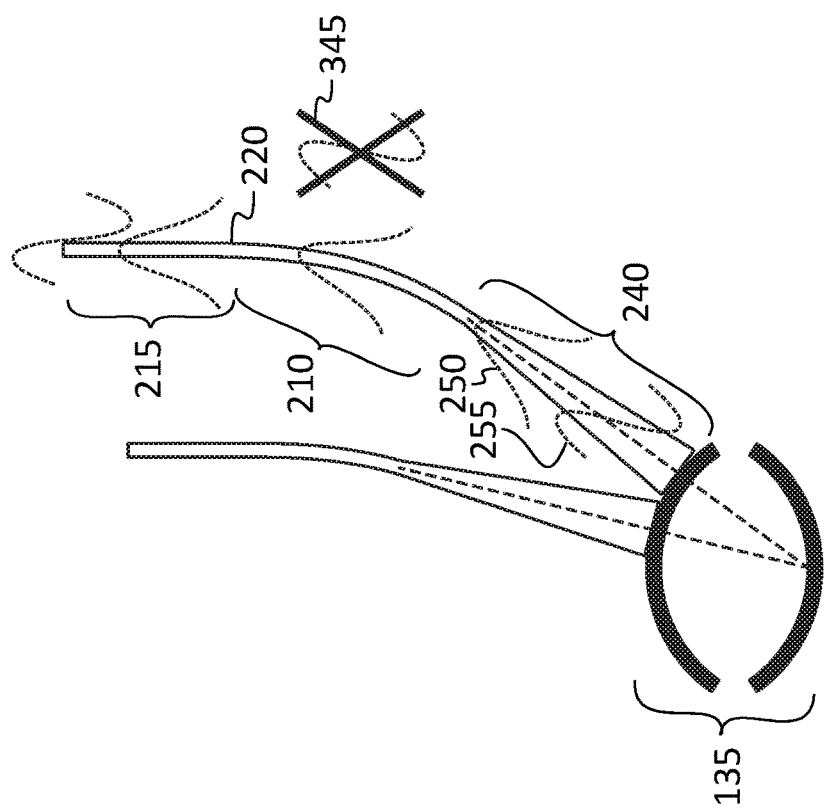
FIG. 2A is a plan view of a portion of an arrayed waveguide grating, according to an embodiment of the present invention.

Coupling into higher order modes may occur by various mechanisms. For example, referring to FIGS. 2A and 2B, in some embodiments a waveguide may include a curved portion 210 following a circular arc or "circular bend", followed by a straight portion 215, so that at the boundary or transition 220 between the curved portion 210 and the straight portion 215, the curvature changes discontinuously. A fundamental mode 225 (e.g., a transverse electric fundamental mode or a transverse magnetic fundamental mode) of curved portion 210 may be offset from the center of the waveguide; accordingly, at the boundary 220 between the curved portion 210 and the straight portion 215 (in which the corresponding fundamental mode 230 is centered), the fundamental mode 225 propagating in the curved portion 210 may couple into a superposition of the corresponding fundamental mode 230 and a higher order (e.g. first-order) mode, in the straight portion 215. Although it may be possible to compensate for the misalignment of the fundamental modes in the straight portion and curved portion by fabricating the waveguide segments so that there is an offset between their respective optical axes, such an offset may cause reflections that also may degrade the performance of the arrayed waveguide grating. Similar coupling into one or more higher order modes may occur, in the structures of FIGS. 2A and 2B, at a junction between another straight portion 240 (e.g., within the second input star coupler aperture 130) and the curved portion 210, but these higher order modes may be significantly attenuated within (e.g., they may radiate out of) the curved portion 210, as indicated by the "X" 345, and as discussed in further detail below. Light may also couple to one or more higher order modes where light is coupled into a waveguide from one of the free-propagation regions if the phase fronts of the free-space waves are not perpendicular to the optical axis of the waveguide. This may occur, for example, for some of the field patterns launched (from points that are off center) into the second free-propagation region 135, when one or more of the plurality of second waveguides 145 is an input of the arrayed waveguide grating. For example, in FIG. 2A, light coupling from the second free-propagation region 135 to the straight portion 240 may couple into a superposition of the fundamental mode 250 and a higher order mode 255. The straight portion 240 may be tapered and, as a result of its taper, may have the property that it would exhibit strong coupling between either fundamental mode and one or more leaky higher order modes if it were curved.

Figure 3B:
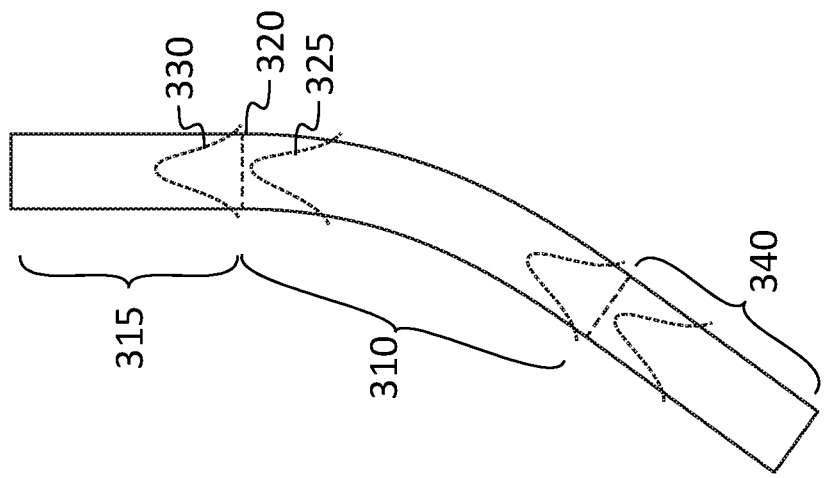
FIG. 3B is an enlarged view of a portion of FIG. 2A, according to an embodiment of the present invention.
Figure 3A:
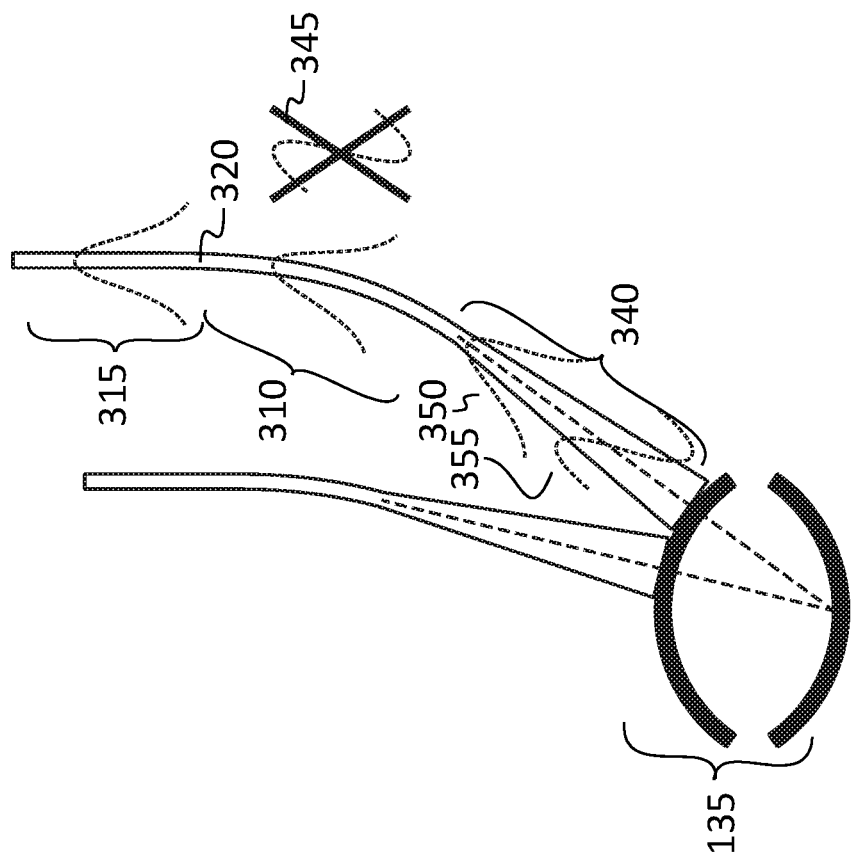
FIG. 3A is a plan view of a portion of an arrayed waveguide grating, according to an embodiment of the present invention.

Referring to FIGS. 3A and 3B, the use of adiabatic bends may in some cases reduce the coupling into higher order modes. In some embodiments a waveguide may include a curved portion 310 following an adiabatic bend, e.g., an Euler arc, described in further detail below, instead of the circular arc or "circular bend", of the curved portion 210 of FIGS. 2A and 2B. The curved portion 310 may be followed by a straight portion 315. The adiabatic bend may have a curvature that varies continuously along the bend and vanishes at both ends of the bend, so that at the boundary or transition 320 between the curved portion 310 and the straight portion 315, the curvature does not change discontinuously. A fundamental mode 325 (e.g., a transverse electric fundamental mode or a transverse magnetic fundamental mode) of the curved portion 310 may be centered within the waveguide, at the boundary 320 between the curved portion 310 and the straight portion 315; accordingly, at the boundary 320 the fundamental mode 325 propagating in the curved portion 310 may couple into only the fundamental mode 330 and not into a higher order (e.g. first-order) mode in the straight portion 315. Similarly, coupling into one or more higher order modes may be absent, in the structures of FIGS. 3A and 3B, at a junction between another straight portion 340 (e.g., within the second input star coupler aperture 130) and the curved portion 310. As is the case in the structure of FIGS. 2A and 2B, light may couple to one or more higher order modes where light is coupled into a waveguide from one of the free-propagation regions if the phase fronts of the free-space waves are not perpendicular to the optical axis of the waveguide. For example, in FIG. 3A, light coupling from the second free-propagation region 135 to the straight portion 340 may couple into a superposition of the fundamental mode 350 and a higher order mode 355. As is the case with the structure of FIGS. 2A and 2B, however, the higher order modes may be significantly attenuated within (e.g., they may radiate out of) the curved portion 310, as indicated by the "X" 345, and as discussed in further detail below.

Referring again to FIG. 1, in some embodiments, the portions of the waveguides (of the waveguide array 120) are straight within the first output star coupler aperture 125 and within the second input star coupler aperture 130, and the waveguide array 120 has a first curved portion 150 and a second curved portion 155, in which each waveguide of the waveguide array 120 is curved according to an adiabatic bend. In the first curved portion 150 the adiabatic bend of each waveguide has vanishing (i.e., zero) curvature at the point at which the waveguide enters the first output star coupler aperture 125. The curvature of the waveguide increases continuously along the waveguide in the direction away from the first output star coupler aperture 125, to a point at or near the middle of the first curved portion 150, beyond which it decreases again, vanishing again at the other end of the first curved portion 150. As such, the curvature of the waveguide as a function of length along the waveguide, beginning at the interface to the first free-propagation region 115, is a continuous function, that is zero for the portion of the waveguide inside the first output star coupler aperture 125 and then increases and decreases again, in the leftward direction along the waveguide, in the first curved portion 150. As used herein, the "curvature" of the waveguide is the reciprocal of the radius of curvature. The sign of the curvature is a matter of convention, and it is defined herein, for the waveguide array 120, to be positive when the center of curvature is on the outside of the "U" shape formed by the waveguide array 120. For example, as illustrated, the curvature of the waveguides in the first curved portion 150 and in the second curved portion 155 is positive.

Waveguides fabricated using photolithography or other fabrication techniques employed to fabricate photonic integrated circuits may have walls with small-scale (e.g., nm-scale) roughness. This roughness may result in each wall of the waveguide having a local curvature, on a small scale, that is relatively large and fluctuates significantly along the length of the waveguide. This local roughness, however, may have relatively little effect on the propagation of light in the waveguide, and on the coupling between fundamental modes and leaky higher order modes. Accordingly, the curvature of a waveguide (as distinct from the local curvature of a wall of the waveguide) is defined herein as the curvature of that would be measured if the small-scale roughness of the waveguide is disregarded. The curvature of a waveguide may be measured, for example, with an optical microscope, which may be insensitive to features (such as waveguide wall roughness) that are significantly smaller than the wavelength of visible light.

Portions of the waveguides of the waveguide array 120 may have the shape of a portion of an Euler spiral, which follows a curve for which the rate of change of curvature with distance along the curve is constant. For example, a curved portion of a waveguide of the waveguide array 120 may have the shape of an Euler arc, which consists of two symmetric portions of an Euler spiral. As used herein, an "Euler arc" (or "Euler bend") is symmetric about its midpoint, has a curvature that is greatest at its midpoint and vanishes at each of the two ends of the Euler arc, and that changes at a constant rate in each half of the Euler arc, the rate of change of curvature being equal in magnitude, and opposite in sign, in the two halves of the Euler arc. The term "Euler curve" is used herein to refer to any portion, of an Euler spiral, that has a vanishing curvature at one end.

The waveguide array 120 may also include a first straight portion 160, a second straight portion 165, a third straight portion 170, a first L bend 175, and a second L bend 180. In some embodiments the transitions between the first output star coupler aperture 125 and the first curved portion 150 are adiabatic for all of the waveguides of the waveguide array 120, i.e., there is no discontinuity in the curvature at these transitions for any of the waveguides of the waveguide array 120. As a result, any higher order modes present in the waveguide and propagating into the first curved portion 150 (i.e., propagating to the right, in FIG. 1) may be attenuated in the first curved portion 150 so that the light at the output of the first curved portion 150 may all be in the fundamental mode, and, moreover, further coupling into higher order modes may be avoided, as a result of the transitions between the first output star coupler aperture 125 and first curved portion 150 being adiabatic.

Similarly, the transitions between the second input star coupler aperture 130 and the second curved portion 155 may be adiabatic. As a result, for light propagating in the other direction, i.e., into the second curved portion 155 and from there into the second input star coupler aperture 130, higher order modes are attenuated in the second curved portion 155, and are not generated at the transitions to the second input star coupler aperture 130, because these transitions are adiabatic. Other transitions in the waveguide array 120 may or may not be adiabatic. For example, there may or may not be a discontinuity in the curvature in one or more of the waveguides at the transition between the first curved portion 150 and the first straight portion 160, at the transition between the first straight portion 160 and the first L bend 175, or the like. Such discontinuities in curvature may result in the coupling of power into higher order modes, but the resulting degradation in performance may be small because these higher order modes may subsequently be attenuated in the first curved portion 150 or in the second curved portion 155 (depending on their direction of propagation), and, as a result, the effect on the fields in first free-propagation region 115 or in the second free-propagation region 135 may be small. As such, in some embodiments, it may be sufficient, if the first waveguide 105 is the input of the arrayed waveguide grating, for each waveguide in the second curved portion 155 to include a portion that is an Euler curve, the end with vanishing curvature being at the point the waveguide enters the second input star coupler aperture 130.

Similarly, if the first waveguide 105 is the output of the arrayed waveguide grating, it may be sufficient for each waveguide in the first curved portion 150 to include a portion that is an Euler curve, the end with vanishing curvature being at the point the waveguide enters the first output star coupler aperture 125.

Figure 4A:
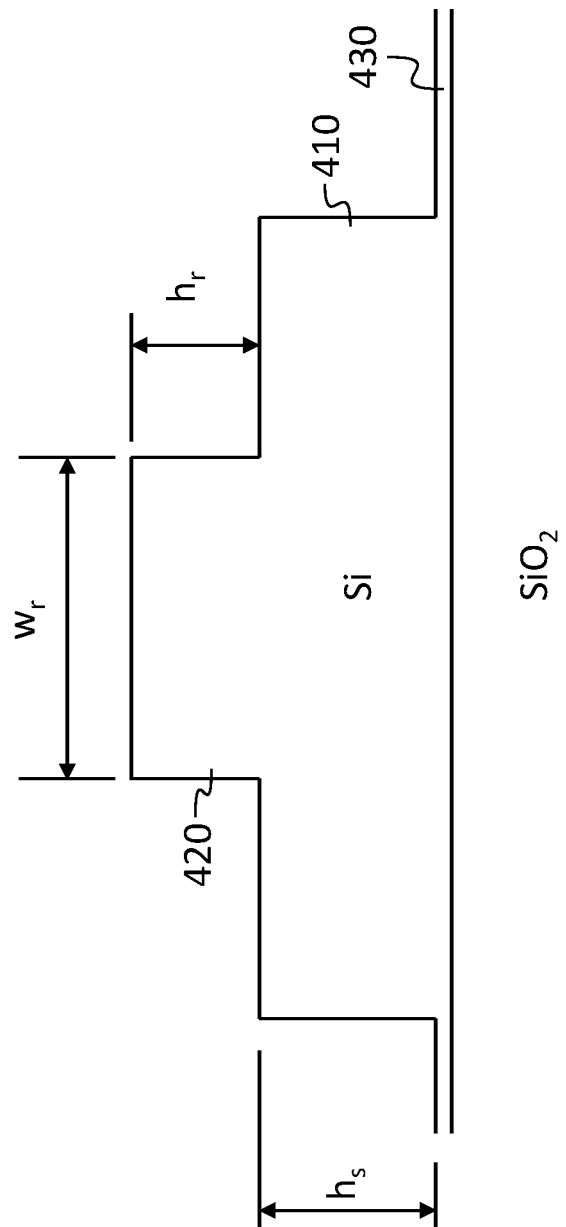
FIG. 4A is a cross section of a rib waveguide, according to an embodiment of the present invention.

In some embodiments, each of the waveguides of the waveguide array 120 is a rib waveguide along a portion of its length. Referring to FIG. 4A, the waveguide may be fabricated as a silicon on insulator (SOI) structure, in which a layer of silicon (Si) 3 microns thick, on a layer of silicon dioxide ($SiO_2$) (which may be referred to as "buried oxide" or "BOX" layer) is etched to form a slab portion 410 and a rib portion 420 extending above the slab portion 410. In one embodiment, the width $w_r$ of the rib is 3.0 microns, the height $h_r$ of the rib is 1.2 microns, and the height $h_s$ of the slab is 1.8 microns. A thin (e.g., 0.2 micron thick) layer 430 of silicon may remain on the silicon dioxide in regions on both sides of the slab, for fabrication purposes; this layer may have a negligible effect on the optical characteristics of the waveguide. Adjacent waveguides in the waveguide array 120 may share a slab portion 410 (as shown in FIG. 4C).

Each of the waveguides of the waveguide array 120 may include one or more tapered portions, affecting the shape of the modes the waveguide may support. For example, within the first output star coupler aperture 125 each waveguide may have a rib portion the width $w_r$ of which tapers from a width of 6 microns at the interface to the first free-propagation region 115 down to 3 microns at the transition to the first curved portion 150. The waveguides in the second input star coupler aperture 130 may be similarly tapered. Each star coupler may also include a plurality of dummy waveguides 185 (that are not part of the waveguide array 120) that may ensure that, to the extent the presence of adjacent waveguides influences the mode shapes in any of the waveguides of the waveguide array 120, the influence is symmetrical for each of the waveguides of the waveguide array 120.

The overall shape of the waveguide array 120 may, as shown in FIG. 1, approximate the shape of a "U", with the direction of propagation of light within the first output star coupler aperture 125 being substantially opposite the direction of propagation of light within the second input star coupler aperture 130. For example, light propagating within the first output star coupler aperture 125 in the outermost waveguide of the waveguide array 120 may propagate in a direction that is within 4 degrees (or within 10 degrees or within 20 degrees) of being in a direction opposite to the direction of propagation of light propagating within the second input star coupler aperture 130 in the outermost waveguide of the waveguide array 120. Such an arrangement may result in an arrayed waveguide grating that is more compact than one in which the change in direction of the light within the arrayed waveguide grating is smaller.

Figure 4B:
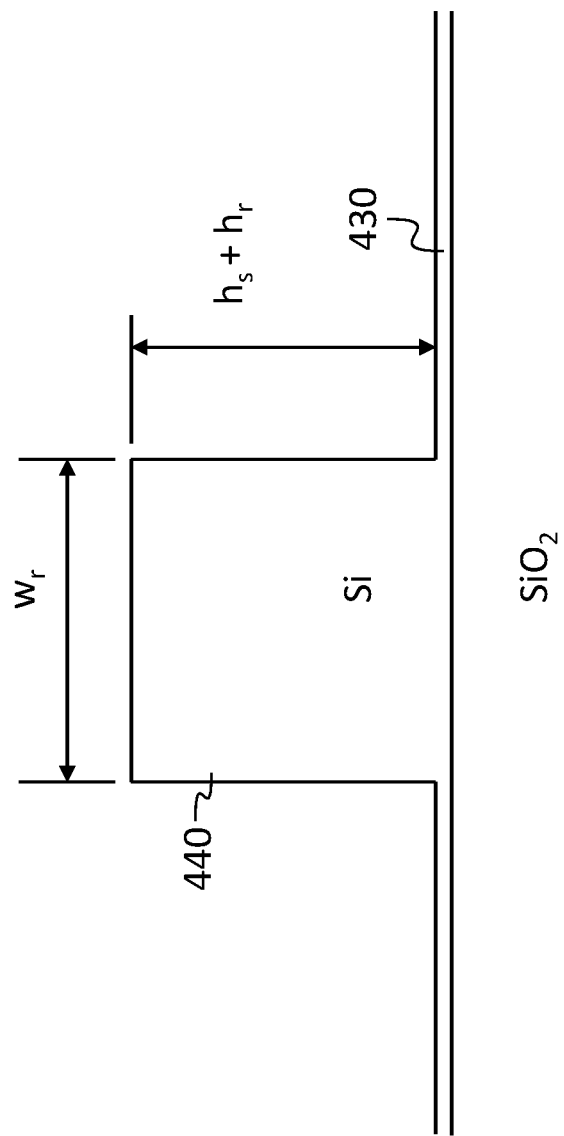
FIG. 4B is a cross section of a strip waveguide, according to an embodiment of the present invention.
Figure 4C:
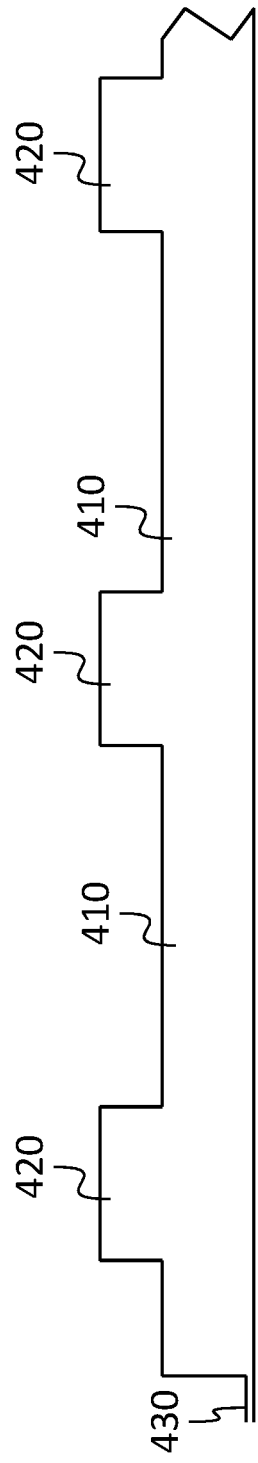
FIG. 4C is a cross section of a portion of an array of rib waveguides on a shared slab, according to an embodiment of the present invention.

Within the first L bend 175 the waveguides may be strip waveguides, as illustrated in FIG. 4B, including a strip 440 and lacking a slab portion. The strip may have a height equal to the combined height of slab portion 410 and rib portion 420, i.e., a height of $h_s+h_r$. The transition between the rib waveguides of the first curved portion 150 and the strip waveguides of the first L bend 175 may be referred to as a "rib to strip converter", having a first end, or "rib end" connected to the first curved portion 150, and a second end, or "strip end" connected to the first L bend 175. The rib to strip converter may be in the first straight portion 160, and may include a region in which the slab portion 410 of each of the rib waveguides tapers to become progressively narrower until it is the same width as the corresponding rib portion 420 and is no longer distinct from the rib portion 420. Each waveguide of the rib to strip converter may be tapered and, as a result of its taper, may have the property that it would exhibit strong coupling between either fundamental mode and one or more leaky higher order modes if it were curved. Accordingly, each rib to strip converter may be fabricated to be substantially straight. The strip waveguides of the L bends 175, 180 may be suitable for forming tight (<100 micron) bend radii with minimal coupling from the fundamental modes into higher order modes. They may also be multi-mode waveguides. To the extent that higher order modes are suppressed by the curved portions 150, 155, and that the rib to strip converters do not couple light into higher order modes, the light coupled into the strip waveguides of the L bends 175, 180 may be entirely in the fundamental modes.

Figure 4D:
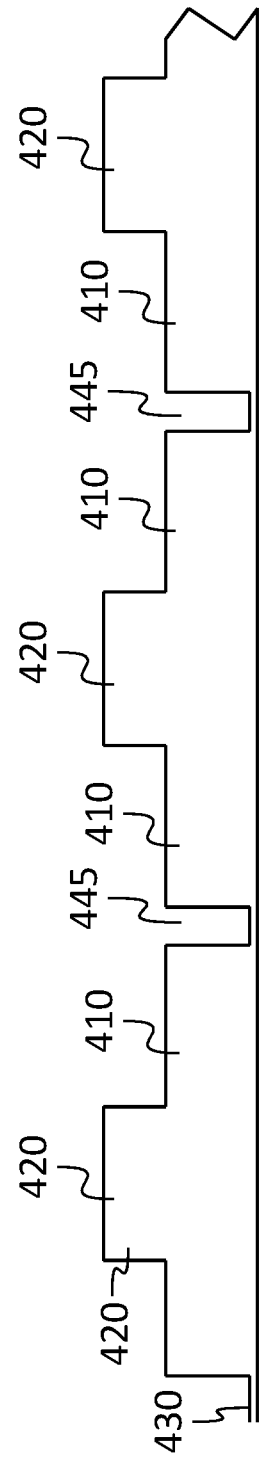
FIG. 4D is a portion of a cross section of a rib to strip converter, according to an embodiment of the present invention.

FIG. 4C shows a cross section of a portion of the waveguide array 120 on the rib end of the rib to strip converter. In the embodiment of FIG. 4C, the rib waveguides share a slab portion 410. FIG. 4D shows a cross section of a portion of the waveguide array 120 at a point within the rib to strip converter. A trench 445 that extends nearly to the bottom of the slab portion, half-way between each pair of adjacent ribs, begins at the rib end of the rib to strip converter and then widens in the direction of the strip end of the rib to strip converter. The waveguides within the second L bend 180 may similarly be strip waveguides (as may be the waveguides within the second straight portion 165), coupled to rib waveguides in the second curved portion 155 by a second rib to strip converter, which may be located in the third straight portion 170.

Figure 5:
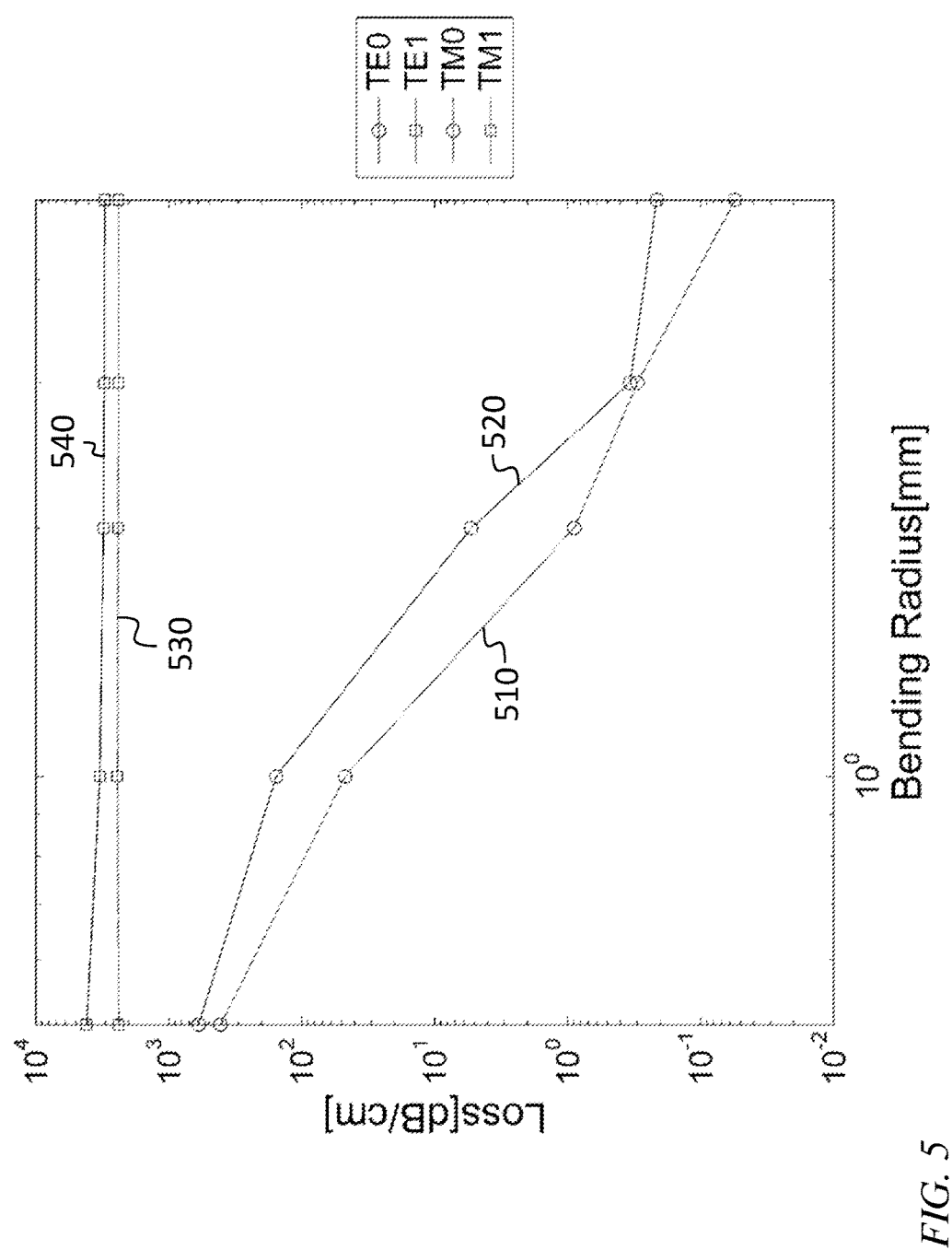
FIG. 5 is a graph of loss as a function of bending radius, according to an embodiment of the present invention.

In some embodiments, the curvature of each of the waveguides in the first curved portion 150 may be selected so as to attenuate both of the first higher order modes (i.e., the first-order transverse electric "TE1" and the first-order transverse magnetic "TM1" modes) sufficiently while not attenuating the fundamental modes (i.e., the TE0 and TM0 modes) to an unacceptable extent. For example, the curvature may be selected so that the attenuation of each of the first higher order modes is at least 100 dB/cm and the attenuation of the fundamental modes is at most 0.1 dB/cm. FIG. 5 is a graph of the loss of fundamental and higher order modes as a function of radius of curvature, for a rib waveguide having a rib width $w_r$ of 3.0 microns, a rib height $h_r$ of 1.2 microns, and a slab height $h_s$ of 1.8 microns. In FIG. 5, a first curve 510 corresponds to the TM0 mode, a second curve 520 corresponds to the TE0 mode, a third curve 530 corresponds to the TM1 mode, and a fourth curve 540 corresponds to the TE1 mode. As can be seen from FIG. 5, a radius of curvature of 5 mm, for example, results in loss of more than 1000 dB/cm for both the TE1 and the TM1 modes, and loss of less than 0.1 dB/cm for both the TE0 and the TM0 modes. In some embodiments, the performance of the arrayed waveguide grating is acceptable if the power in higher order modes launched into either of the free-propagation regions is at least 30 dB less than the power in a fundamental mode. This may be accomplished, if the power coupled into higher order modes due to misalignment of the phase fronts is 20 dB less than that coupled into a fundamental mode, if the higher order modes are further attenuated by at least 10 dB (e.g., in a curved section 1 mm long, with loss of 100 dB/cm for higher order modes).

In some embodiments, the strip waveguide, instead of having the same width as the rib of the rib waveguide (as shown in FIGS. 4A and 4B), may be narrower than the rib of the rib waveguide, having a width of, e.g., 1.5 microns.

Table 1 shows performance achievable with rectangular arrayed waveguide gratings according to embodiments of the present invention, where asterisks indicate expected values based on simulations and the remaining characteristics are either measured in prototypes or the direct result of design choices. In the table, "PDF" is the polarization dependent frequency offset and "PDL" is the polarization dependent loss.

TABLE 1

Characteristics of example embodiments

| Number of channels | Channel spacing [GHz] | Insertion Loss [dB] | Cross Talk [dB] | PDF [GHz] | PDL [dB] | Channel reg. [nm] | Size |
|---|---|---|---|---|---|---|---|
| 4 | 400 | 2.5 | <−25 | <10 | <0.5 | <0.1 | 0.7 mm × 2.2 mm |
| 8 | 200 | 2.5 | <−25 | <10 | <0.5 | <0.1 | 1.6 mm × 3.8 mm |
| 16 | 100 | 2.5 | <−25 | <10 | <0.5 | <0.1 | 2 mm × 6 mm |
| 24 | 100 | <3.5* | <−25* | <10* | <0.5* | <0.1* | 3 mm × 8 mm* |
| 48 | 100 | <5* | <−25* | <10* | <0.5* | <0.1* | 7 mm × 14 mm* |

An adiabatic curve may also be used for mode filtering (i.e., to avoid coupling power into higher order modes and to attenuate higher order modes) in applications other than an arrayed waveguide grating. For example, referring to FIG. 6, a high order mode stripper includes a first adiabatic bend 610 and a second adiabatic bend 615 forming an adiabatic S-bend, coupled to a rib to strip converter 620, which is followed by a section 625 of strip waveguide and a photonic device 630. An optical fiber 640 may terminate near the end of a photonic integrated circuit 645 containing the waveguides, and may convey light into a waveguide end 650 (e.g., a first end of the first adiabatic bend 610). The optical fiber 640 may not be perfectly aligned with the waveguide end 650 on the photonic integrated circuit 645, and, as a result, light emitted by the optical fiber 640 may couple into a superposition, in the first adiabatic bend 610, of a fundamental mode and a higher order mode. The higher order mode may however be strongly attenuated because of the curvature of the adiabatic S-bend, so that the mode launched into the rib to strip converter 620 is nearly purely a fundamental mode of the rib to strip converter 620. This fundamental mode then is transformed into the fundamental mode of the section 625 of strip waveguide, and delivered to the photonic device.

Figure 6:
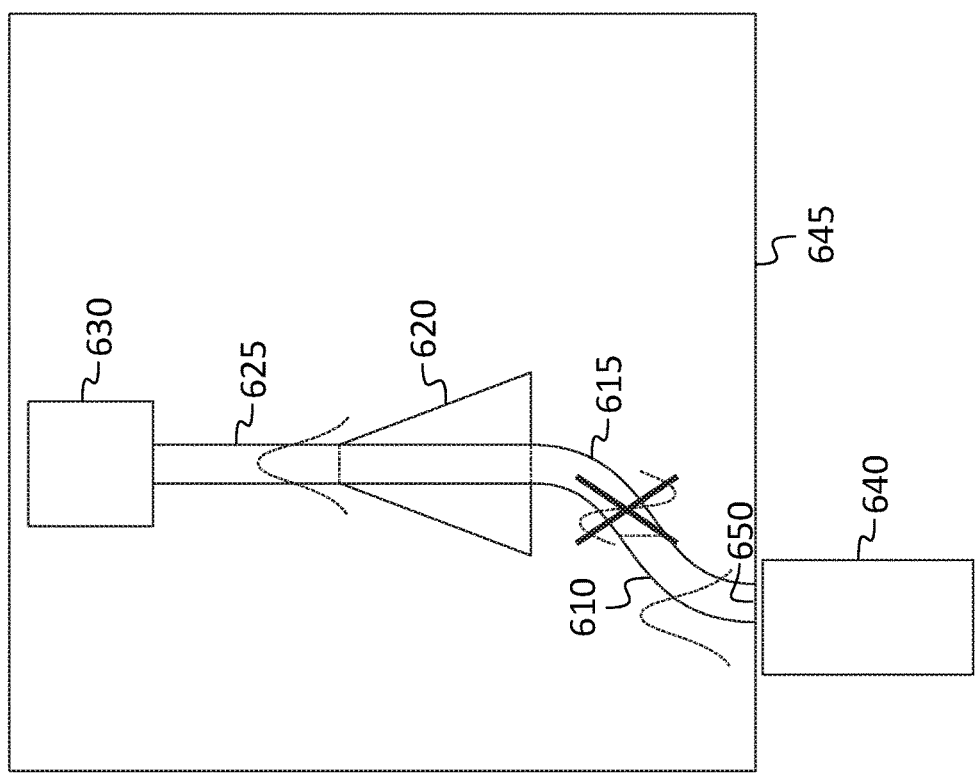
FIG. 6 is a plan view of a photonic integrated circuit including a mode stripper, according to an embodiment of the present invention.

The configuration of FIG. 6 may have performance advantages over an alternate arrangement in which a straight section of waveguide is employed instead of the adiabatic S-bend (and the position of the optical fiber 640 is correspondingly shifted) because in this alternate arrangement, misalignment of the optical fiber 640 may result in coupling of light into a higher order mode which is not strongly attenuated and accordingly propagates through the rib to strip converter 620, through the section 625 of strip waveguide, and into the photonic device 630. The configuration of FIG. 6 may also have performance advantages over an alternate arrangement in which an S-bend composed of two circular arcs is used instead of the adiabatic S-bend, because in this alternate arrangement, although the optical power launched into higher order modes of the S-bend as a result of misalignment of the optical fiber 640 is attenuated by the S-bend, the discontinuity in curvature at the transition between the S-bend and the rib to strip converter 620 may result in coupling of optical power into higher order modes in the rib to strip converter 620.

In some embodiments, a waveguide with an adiabatic bend may be of use in any system in which light is launched from a waveguide into a region (referred to herein as an "interference region") in which it may interfere with light from other sources, e.g., with light from other waveguides. Examples of interference regions include the interior of a multimode interference (MMI) coupler, and the free-propagation region of a star coupler, into either of which light may be launched from two or more waveguides. Leaky higher order modes may also affect the behavior of such a coupler, and, accordingly measures (such as the use of a curved portion of waveguide to attenuate leaky higher order modes, and the use of adiabatic bends to avoid coupling power into leaky higher order modes) may be taken to control the amplitude of leaky higher order modes. Such a coupler may be used, for example, in a Mach-Zehnder interferometer.

In some embodiments, adiabatic bends that are not Euler bends are used. For example, the curvature as a function of length in an adiabatic bend may not be a linear function of position along the bend but may vary as another polynomial, or, more generally, as another continuous and/or differentiable function. In a bend without discontinuous changes in curvature, coupling into higher order modes may nonetheless occur if the magnitude of the rate of change of curvature is high (e.g., if it changes significantly over a distance smaller than the wavelength of the light). Accordingly, in some embodiments, the curvature in an adiabatic bend may be selected so that the rate of change of curvature is less than $3/mm^2$, to avoid significant coupling into higher order modes.

Although exemplary embodiments of a single mode waveguide with an adiabatic bend have been specifically described and illustrated herein, many modifications and variations will be apparent to those skilled in the art. Accordingly, it is to be understood that a single mode waveguide with an adiabatic bend constructed according to principles of this invention may be embodied other than as specifically described herein. The invention is also defined in the following claims, and equivalents thereof.

What is claimed is:

1. An arrayed waveguide grating having an input waveguide and an output waveguide, the arrayed waveguide grating comprising:
 a first star coupler, comprising:
  a first input star coupler aperture connected to the input waveguide,
  a first free-propagation region, and
  a first output star coupler aperture,
 a second star coupler, comprising:
  a second input star coupler aperture,
  a second free-propagation region, and
  a second output star coupler aperture connected to the output waveguide; and an array of waveguides, extending into the first output star coupler aperture and into the second input star coupler aperture and connecting the first output star coupler aperture to the second input star coupler aperture, the first input star coupler aperture being coupled to the first output star coupler aperture through the first free-propagation region, the second input star coupler aperture being coupled to the second output star coupler aperture through the second free-propagation region, each waveguide of the array of waveguides producing a net clockwise change in direction for propagation through the waveguide from the first output star coupler aperture to the second input star coupler aperture, each waveguide of the array of waveguides having:
 a first portion,
 a second portion having a first end and a second end,
 a third portion,
 a fourth portion having a first end and a second end,
 a fifth portion, and
 a sixth portion, the first portion of each waveguide of the array of waveguides being within the first output star coupler aperture and having a maximum curvature less than 0.01/mm, the second portion of each waveguide of the array of waveguides being outside the first output star coupler aperture, the second portion being contiguous, at the first end of the second portion, with the first portion, the second portion of each waveguide of the array of waveguides having:
 at the first end of the second portion, a curvature less than 0.01/mm,
 at the second end of the second portion, a curvature less than 0.01/mm, and
 at a point between the first end of the second portion and the second end of the second portion, a curvature greater than 0.3/mm, the curvature being counterclockwise for propagation through the waveguide from the first output star coupler aperture to the second input star coupler aperture, the third portion of each waveguide of the array of waveguides being within the second input star coupler aperture and having a maximum curvature less than 0.01/mm, the fourth portion of each waveguide of the array of waveguides being outside the second input star coupler aperture, the fourth portion being contiguous, at the first end of the fourth portion, with the third portion, the fourth portion of each waveguide of the array of waveguides having:
 at the first end of the fourth portion, a curvature less than 0.01/mm,
 at the second end of the fourth portion, a curvature less than 0.01/mm, and
 at a point between the first end of the fourth portion and the second end of the fourth portion, a curvature greater than 0.3/mm, the curvature being counterclockwise for propagation through the waveguide from the first output star coupler aperture to the second input star coupler aperture, the magnitude of the rate of change of curvature of each waveguide being, everywhere on a segment of the waveguide including the first portion and the second portion, less than $15/mm^2$, the curvature being, everywhere on the segment, less than 2/mm, the fifth portion of each waveguide of the array of waveguides being contiguous with the second portion of the waveguide, and having a curvature less than 0.01/mm, the sixth portion of each waveguide of the array of waveguides being contiguous with the fourth portion of the waveguide, and having a curvature less than 0.01/mm, a centerline of the first star coupler being oblique to the fifth portion of a waveguide of the array of waveguides, and a centerline of the second star coupler being oblique to the sixth portion of a waveguide of the array of waveguides.

2. The arrayed waveguide grating of claim 1, wherein the magnitude of the rate of change of curvature of a first waveguide of the array of waveguide is, everywhere on a segment of the first waveguide including the third portion and the fourth portion of the first waveguide, less than $15/mm^2$.

3. The arrayed waveguide grating of claim 1, wherein the first output star coupler aperture comprises a plurality of tapered rib waveguides.

4. The arrayed waveguide grating of claim 3, wherein each of the tapered rib waveguides has a rib having:
 a first width at a first end of the first input star coupler aperture adjacent the first free-propagation region, and
 a second width at a second end of the first input star coupler aperture, the second end being opposite the first end of the first input star coupler aperture,
 the first width being at least 30% greater than the second width.

5. The arrayed waveguide grating of claim 1, wherein the first output star coupler aperture has a length and comprises:
 a first dummy waveguide on a first side of the array of waveguides, the first dummy waveguide extending only along the length of the first output star coupler aperture; and
 a second dummy waveguide on a second side of the array of waveguides, opposite the first side, the second dummy waveguide extending only along the length of the first output star coupler aperture.

6. The arrayed waveguide grating of claim 1, wherein the array of waveguides has a first L bend portion and a second L bend portion,
 wherein:
 within the first L bend portion, each waveguide of the array of waveguides has a bend, resulting in a change of direction of more than 60 degrees and less than 120 degrees, and
 within the second L bend portion, each waveguide of the array of waveguides has a bend, resulting in a change of direction of more than 60 degrees and less than 120 degrees.

7. The arrayed waveguide grating of claim 6, wherein:
 within the first L bend portion, each waveguide of the array of waveguides is a strip waveguide, and
 within the second L bend portion, each waveguide of the array of waveguides is a strip waveguide.

8. The arrayed waveguide grating of claim 7, wherein each waveguide of the array of waveguides has a straight portion between the first L bend portion and the second L bend portion.

9. The arrayed waveguide grating of claim 6, wherein the array of waveguides has a rib to strip converter portion between the first output star coupler aperture and the first L bend portion, the rib to strip converter having a rib end and a strip end, each waveguide of the array of waveguides being
a rib waveguide at the rib end of the rib to strip converter, and
a strip waveguide at the strip end of the rib to strip converter, and
having, within the rib to strip converter, a cross section varying continuously from a cross section of a rib waveguide to a cross section of a strip waveguide.

10. The arrayed waveguide grating of claim 9, where, within the rib to strip converter, each waveguide of the array of waveguides has a curvature of less than 0.01/mm.

11. The arrayed waveguide grating of claim 9 wherein each waveguide of the array of waveguides has, along its length, a rate of change of curvature with a magnitude of less than $15/mm^2$.

12. The arrayed waveguide grating of claim 1, wherein the second portion is configured to transmit, from the first end of the second portion, to the second end of the second portion:
with an attenuation of less than 1 dB:
a fundamental transverse electric mode, and
a fundamental transverse magnetic mode, and
with an attenuation of more than 10 dB:
a first-order transverse electric mode, and
a first-order transverse magnetic mode.

13. An arrayed waveguide grating having an input waveguide and an output waveguide, the arrayed waveguide grating comprising:
a first input star coupler aperture connected to the input waveguide;
a first free-propagation region;
a first output star coupler aperture;
a second input star coupler aperture;
an array of waveguides, extending into the first output star coupler aperture and into the second input star coupler aperture and connecting the first output star coupler aperture to the second input star coupler aperture;
a second free-propagation region; and
a second output star coupler aperture connected to the output waveguide,
the first input star coupler aperture being coupled to the first output star coupler aperture through the first free-propagation region,
the second input star coupler aperture being coupled to the second output star coupler aperture through the second free-propagation region,
each waveguide of the array of waveguides having:
a first portion, and
a second portion having a first end and a second end,
the first portion being within the first output star coupler aperture and having a maximum curvature less than 0.01/mm,
the second portion being outside the first output star coupler aperture, the second portion being contiguous, at the first end of the second portion, with the first portion,
the second portion having:
at the first end of the second portion, a curvature less than 0.01/mm,
at the second end of the second portion, a curvature less than 0.01/mm, and
at a point between the first end of the second portion and the second end of the second portion, a curvature greater than 0.3/mm, and
the magnitude of the rate of change of curvature of each waveguide being, everywhere on a segment of the waveguide including the first portion and the second portion, less than $15/mm^2$,
the curvature being, everywhere on the segment, less than 2/mm,
each waveguide being, within the second portion, a rib waveguide having a rib width of about 3.0 microns and a rib height of about 1.2 microns.

14. An arrayed waveguide grating having an input waveguide and an output waveguide, the arrayed waveguide grating comprising:
a first input star coupler aperture connected to the input waveguide;
a first free-propagation region;
a first output star coupler aperture;
a second input star coupler aperture;
an array of waveguides, extending into the first output star coupler aperture and into the second input star coupler aperture and connecting the first output star coupler aperture to the second input star coupler aperture;
a second free-propagation region; and
a second output star coupler aperture connected to the output waveguide,
the first input star coupler aperture being coupled to the first output star coupler aperture through the first free-propagation region,
the second input star coupler aperture being coupled to the second output star coupler aperture through the second free-propagation region,
a first waveguide of the array of waveguides having:
a first portion,
a second portion having a first end and a second end, and
an L bend,
the first portion being within the first output star coupler aperture and having a maximum curvature less than 0.01/mm,
the second portion being outside the first output star coupler aperture, the second portion being contiguous, at the first end of the second portion, with the first portion,
the second portion having:
at the first end of the second portion, a curvature less than 0.01/mm,
at the second end of the second portion, a curvature less than 0.01/mm, and
at a point between the first end of the second portion and the second end of the second portion, a curvature greater than 0.3/mm,
the magnitude of the rate of change of curvature of the first waveguide being, everywhere on a segment of the first waveguide including the first portion and the second portion, less than $15/mm^2$,
the curvature being discontinuous at one end of the L bend.

* * * * *